United States Patent [19]

Lee

[11] Patent Number: 5,920,341
[45] Date of Patent: Jul. 6, 1999

[54] CIRCUIT AND METHOD FOR REPRODUCING A STILL IMAGE IN A CAMCORDER

[75] Inventor: Yong-Hyun Lee, Seoul, Rep. of Korea

[73] Assignee: Samsung Electronics Co., Ltd., Kyungki-do, Rep. of Korea

[21] Appl. No.: 08/675,294

[22] Filed: Jul. 1, 1996

[30] Foreign Application Priority Data

Jul. 20, 1995 [KR] Rep. of Korea ................ 95-21409

[51] Int. Cl.⁶ ................................ H04N 5/228
[52] U.S. Cl. ................................ 348/208
[58] Field of Search ............... 348/208; 386/1, 386/8, 21, 34, 35; 360/62; 396/52, 55

[56] References Cited

U.S. PATENT DOCUMENTS

| | | | |
|---|---|---|---|
| 4,725,894 | 2/1988 | Sasaki | 386/34 |
| 4,884,150 | 11/1989 | Kanda | 386/8 |
| 5,130,858 | 7/1992 | Ebara | 386/8 |
| 5,204,741 | 4/1993 | Sakaguchi | 348/208 |
| 5,327,264 | 7/1994 | Iyama | 386/1 |
| 5,345,264 | 9/1994 | Murata | 348/208 |
| 5,508,813 | 4/1996 | Sakaegi | 386/1 |
| 5,526,044 | 6/1996 | Tokumitsu | 348/208 |
| 5,608,532 | 3/1997 | Park | 386/34 |
| 5,719,951 | 2/1998 | Shackleton | 382/118 |
| 5,757,977 | 5/1998 | Mancuso | 382/260 |

FOREIGN PATENT DOCUMENTS 57-55677   4/1982   Japan ........................... 386/8

*Primary Examiner*—Bryan Tung
*Attorney, Agent, or Firm*—Sughrue, Mion, Zinn, Macpeak & Seas, PLLC

[57] ABSTRACT

A camcorder having a still image reproducing circuit and a method for reproducing a still image are provided. The circuit includes an image pickup means for generating an image pickup signal in accordance with incident light; a hand-quiver compensating means for converting the image pickup signal into a digital signal to store temporarily the converted signal, for reading the stored digital signal, and for converting the read signal into an analog signal, thereby compensating for operator hand-quiver; a reproducing means for reproducing a video signal from a recording medium and outputting synthesized luminance and chrominance signals; a decoder for decoding the luminance and chrominance signals from the reproducing means and generating difference signals; a first switch for selecting an output signal from one of the image pickup means and the decoder, and for outputting the selected signal to the hand-quiver compensating means; and a second switch for selecting an output signal from one of the hand-quiver compensating means and the reproducing means, and for outputting the selected signal through an output terminal. Accordingly, a clean still image can be reproduced with a cost-effective circuit.

5 Claims, 2 Drawing Sheets

CIRCUIT AND METHOD FOR REPRODUCING A STILL IMAGE IN A CAMCORDER

BACKGROUND OF THE INVENTION

The present invention relates to a camcorder, and more particularly, to a camcorder having a still image reproducing circuit for reproducing a still image without noise effects by incorporating a circuit which compensates for the unsteadiness of a user's hands. The present invention also relates to a method for producing a noise-free still image in a camcorder.

Typically, when a still image is reproduced in a videocassette recorder or camcorder, the image is represented by an analog signal reproduced by a head during a still mode operation. In the conventional arrangement, when a user pushes a still mode key, while the camcorder is operating in a reproducing mode, a capstan motor stops and a head picks up only a portion of the magnetic tracks on a tape. During the still mode operation, a signal for the portion of the tape not being picked up by the head affects the picked up signal as noise. This noise results in instability of a vertical synchronizing signal and thus produces the skewing phenomenon when the still image is displayed on a screen. As thus described, the conventional videocassette recorder and camcorder generate significant noise and exhibit low resolution when reproducing a still image.

SUMMARY OF THE INVENTION

To solve the aforementioned problems, it is an object of the present invention to provide a camcorder having a still image reproducing circuit for reproducing a still image which is essentially free of noise.

It is another object of the present invention to provide a method for reproducing such a noise-free still image.

To accomplish the first object of the present invention, there is provided a camcorder having a still image reproducing circuit, comprising: an image pickup means for generating an image pickup signal in accordance with incident light; a hand-quiver compensating means for converting an image signal into a digital signal to store temporarily the converted signal, for reading the stored digital signal, and for converting the read signal into an analog signal, thereby compensating for operator hand-quiver; a reproducing means for reproducing a video signal from a recording medium and outputting synthesized luminance and chrominance signals; a decoder for decoding the luminance and chrominance signals from the reproducing means and generating difference signals; a first switch for selecting an output signal from one of the image pickup means and the decoder, and for outputting the selected signal to the hand-quiver compensating means; and a second switch for selecting an output signal from one of the hand-quiver compensating means and the reproducing means, and for outputting the selected signal to an output terminal for display.

To accomplish the second object of the present invention, there is provided a method of reproducing a still image of a camcorder according to a user input in a reproducing mode, comprising the steps of: converting reproduced signals into difference signals after a control key is operated by the user; converting the difference signals into digital signals; temporarily storing the digital signals; converting the temporarily stored digital signals into synthesized analog video signals; and displaying a still image as synthesized analog video signals.

BRIEF DESCRIPTION OF THE DRAWINGS

The above objects and advantages of the present invention will become more apparent by a detailed description of a preferred embodiment thereof with reference to the attached drawings in which.

DETAILED DESCRIPTION OF THE INVENTION

Figure 1:
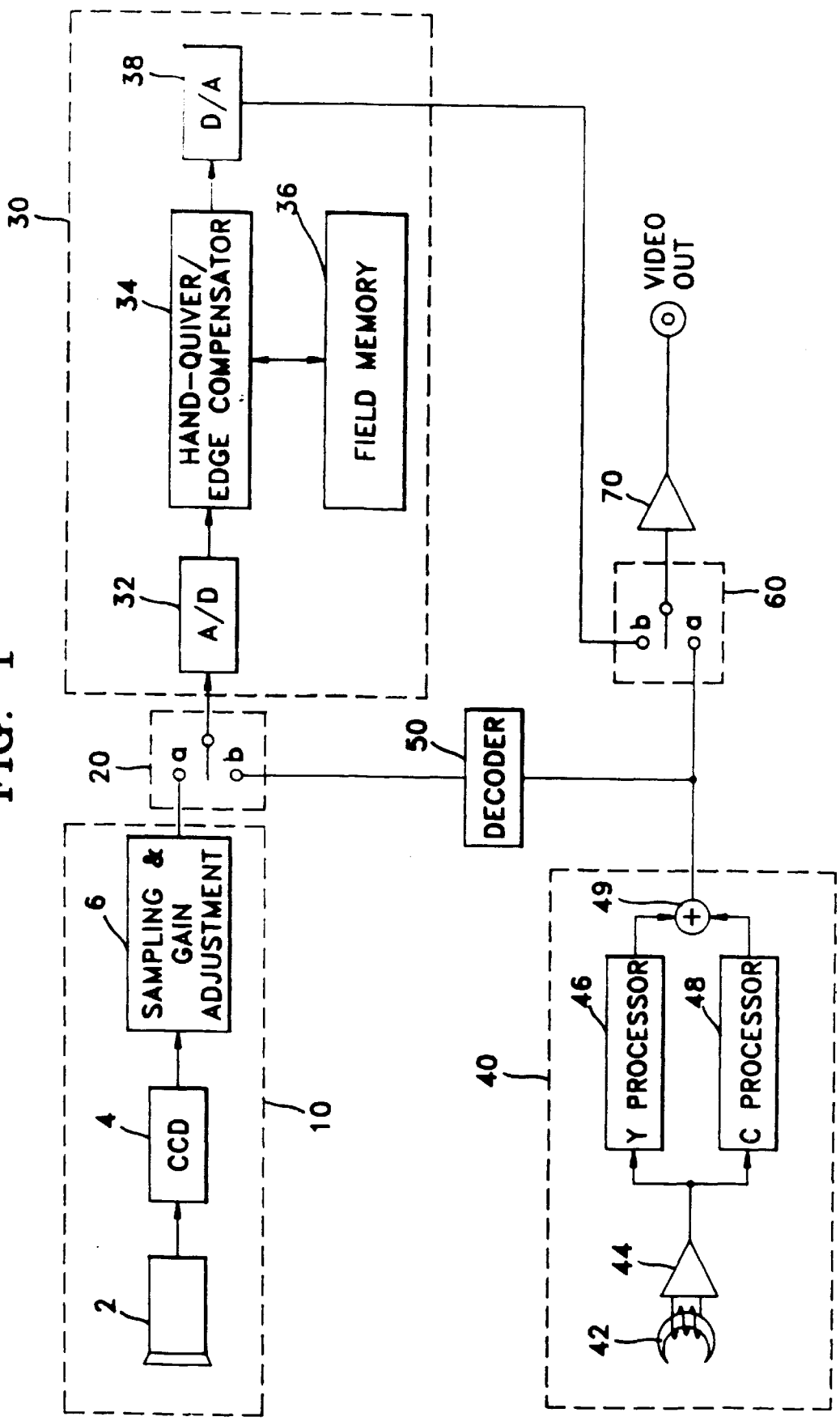
FIG. 1 is a block diagram of a still image reproducing circuit of a camcorder, according to the present invention.

FIG. 1 shows an embodiment of a still image reproducing circuit of a camcorder, according to the present invention. In FIG. 1, reference numeral 10 denotes an image pickup means, reference numeral 20 denotes a first switch, reference numeral 30 denotes a hand-quiver compensating means, reference numeral 40 denotes a reproducing means, reference numeral 50 denotes a decoder, reference numeral 60 denotes a second switch, and reference numeral 70 denotes an output amplifier.

The image pickup means 10 comprises a lens 2, a charge-coupled device (CCD) 4 and a sampling and gain adjustment portion 6. The charge-coupled device 4 generates a discontinuous analog signal of a pixel unit according to incident light. The sampling and gain adjustment portion 6 samples the discontinuous analog signal output from the charge-coupled device 4, converts the discontinuous signal into a continuous analog signal, and makes a gain adjustment.

The hand-quiver compensating means 30 comprises an analog-to-digital (A/D) convertor 32, a hand-quiver/edge compensator 34, a field memory 36, and a digital-to-analog (D/A) convertor 38. The hand-quiver/edge compensator 34 compensates for the unsteadiness of an operator's hand and emphasizes the edge portion of the image signal to prevent image deterioration. The field memory 36 temporarily stores the digital signal of the hand-quiver/edge compensator 34.

The reproducing means 40 comprises a head 42, a pre-amplifier 44, a luminance (Y) signal processor 46, a chrominance (C) signal processor 48 and a synthesizing portion 49. The head 42 reads an image signal from a recording medium (not shown) and the read image signal is amplified to a predetermined level by the pre-amplifier 44. Thereafter, the Y and C signal processors 46 and 48 process the luminance and chrominance signals which are synthesized to be output by the synthesizing portion 49.

The decoder 50 generates difference signals R–Y, G–Y and B–Y by decoding the synthesized luminance and chrominance signals.

The output amplifier 70 amplifies an input composite video signal for output to a viewfinder or an image displaying device.

The first switch 20 selects either the output signal from the decoder 50 or the output signal from the image pickup means 10 under the control of a microcomputer (not shown) and in accordance with a mode selection input by the user. The switch applies the selected signal to the hand-quiver compensation means 30.

The second switch 60 selects either the output signal from the synthesizing portion 49 or the output signal from the digital-to-analog convertor 38 also under the control of the microcomputer in accordance with a selected mode and outputs the selected signal via the output amplifier 70.

Figure 2:
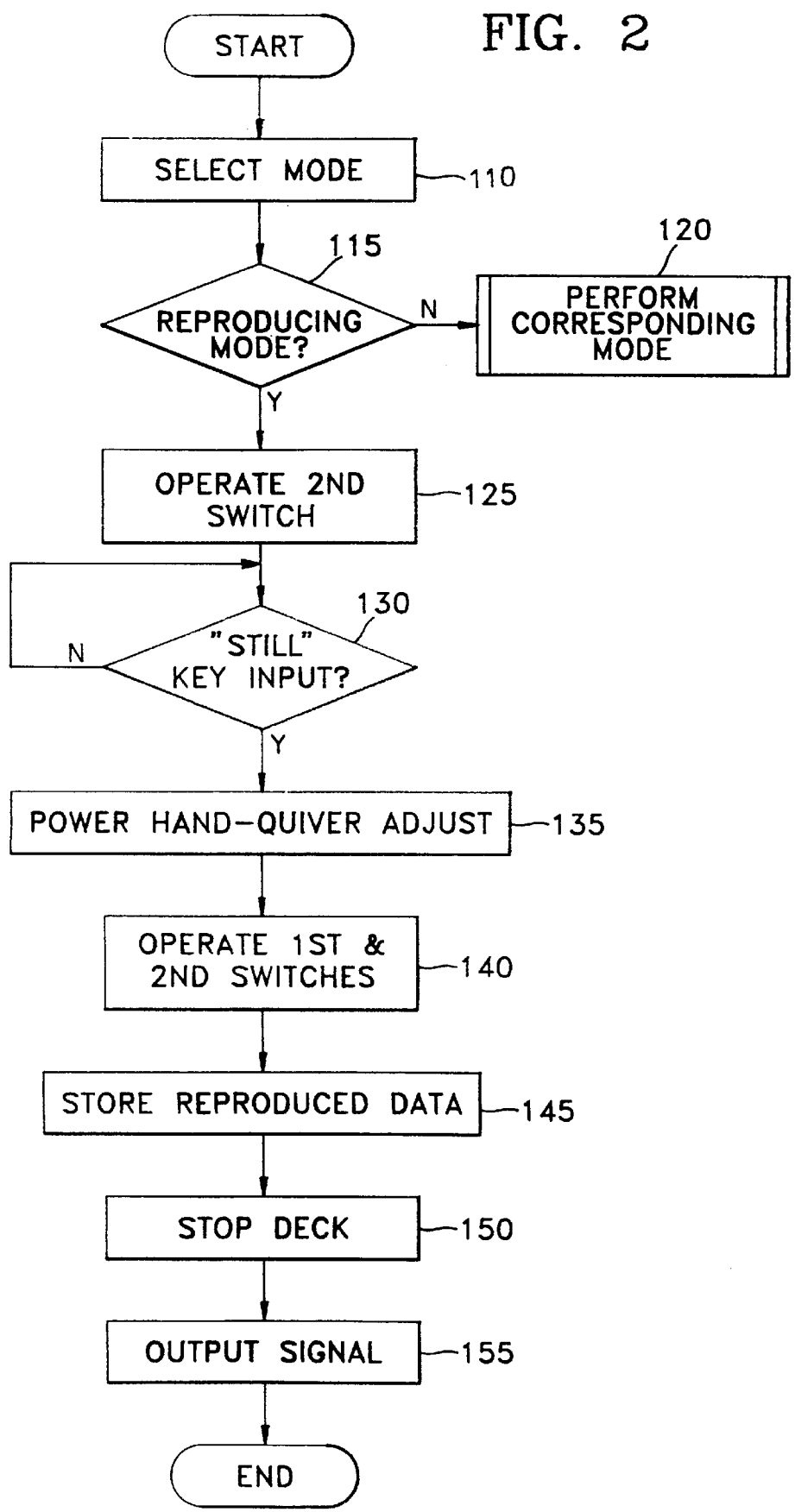
FIG. 2 is a flowchart for explaining the operation of the circuit of FIG. 1.

An operational description of the circuit described above will be given with reference to FIG. 2.

First, the user selects a camera mode, reproducing mode, or tele-recording mode (step 110). If the reproducing mode is selected (step 115), the second switch 60 is switched to the "a" terminal (step 125), and the hand-quiver compensating means 30 is powered down to reduce power consumption. With the selection of the reproducing mode, the output amplifier 70 amplifies and outputs the synthesized image signal Y+C reproduced by the reproducing means 40.

If, on the other hand, the reproduction mode is not selected, a different set of procedures is performed; i.e., the camera mode or tele-recording mode is performed (step 120).

During the reproducing mode, if the user pushes a control key to reproduce a still image (step 130), the hand-quiver compensating means 30 is turned on (step 135). Subsequently, the first and second switches 20 and 60 are both switched to the "b" terminal (step 140). The decoder 50 transforms the video signal synthesized by the reproducing means 40 into difference signals and inputs the resulting difference signals to the analog-to-digital convertor 32 for conversion into digital signals. The hand-quiver/edge compensator 34 compensates for operator hand-quiver and enhances the edge of the digital image signal. The compensated result is temporarily stored in the field memory 36 (step 145). At this time, the reproducing means 40 and deck (not shown) are stopped to reduce power consumption (step 150). The data temporarily stored in the field memory 36 is read by the hand-quiver/edge compensator 34, converted into an analog signal by the digital-to-analog convertor 38, and amplified for output by the output amplifier 70 (step 155). Therefore, a distortion-free still image can be reproduced by using the reproducing signals stored in the hand-quiver compensating means 30, which is of a known configuration.

In contrast with the conventional apparatus which produces a still image via a reproducing head, the still image reproducing circuit and the method for producing still images according to the present invention enables the reproduction of a clean still image. The method and apparatus provide for conversion of the reproduction signal into a digital signal, temporary storage of the converted signal, and conversion of the stored digital signal into an analog signal for output and display. In addition, according to a preferred embodiment of the present invention, the apparatus adopts a hand-quiver compensating means of a known configuration. Therefore, additional cost is not necessary to produce the noise-free still image.

What is claimed is:

1. A camcorder having a still image reproducing circuit, said circuit comprising:

an image pickup means for generating an image pickup signal in accordance with incident light;

a hand-quiver compensating means for converting an image signal into a digital signal to store the converted signal, for reading the stored digital signal, and for converting the read signal into an analog signal;

a reproducing means for reproducing a video signal from a recording medium and for outputting synthesized luminance and chrominance signals;

a decoder for decoding the luminance and chrominance signals from said reproducing means and for generating difference signals;

a first switch for selecting output signals from one of said image pickup means and said decoder, and for outputting the selected signal to said hand-quiver compensating means as said image signal; and a second switch for selecting output signals from one of said hand-quiver compensating means and said reproducing means, and for outputting the selected signal to an output terminal.

2. A camcorder having a still image reproducing circuit according to claim 1 further comprising:

a user control means for receiving control commands from a user, wherein said first and second switches select output signals in accordance with said control commands.

3. A camcorder having a still image reproducing circuit according to claim 2, wherein said control commands comprise a still command, and said hand-quiver compensating means comprises:
   an analog-to-digital converter for producing the digital signal from said image signal;
   a field memory for temporarily storing said digital signal; and
   a digital-to-analog converter for receiving as input said stored digital signal as input and for outputting said analog signal, wherein in response to said still command, said analog-to-digital converter receives as input said difference signals from said decoder via said first switch as said image signal and said digital-to-analog converter outputs said analog signal to said output terminal via said second switch.

4. A camcorder having a still image reproducing circuit according to claim 3, wherein said hand-quiver compensating means further comprises:

a hand-quiver compensator for producing a compensated and edge enhanced digital signal from said digital signal, for writing said compensated and edge enhanced digital signal to said field memory, and for routing said digital signal from said field memory to said digital-to-analog converter.

5. A camcorder having a still image reproducing circuit according to claim 2, wherein said control commands comprise a reproduce command, and said second switch selects the output of said of said reproducing means in response to said reproduce command and said hand-quiver compensating means is powered down.

* * * * *